United States Patent
Ott et al.

(10) Patent No.: US 11,875,939 B2
(45) Date of Patent: Jan. 16, 2024

(54) METHOD AND DEVICE FOR CONTROLLING A PART MOVABLE WITH THE AID OF A COIL AND SOLENOID VALVE

(71) Applicant: Robert Bosch GmbH, Stuttgart (DE)

(72) Inventors: Christof Ott, Asperg (DE); Daniel Seiler-Thull, Stuttgart (DE); Michael Hilsch, Gaertringen (DE); Tobias Mauk, Stuttgart (DE); Torsten Berger, Remseck Am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 672 days.

(21) Appl. No.: 16/625,145

(22) PCT Filed: May 2, 2018

(86) PCT No.: PCT/EP2018/061224
§ 371 (c)(1),
(2) Date: Dec. 20, 2019

(87) PCT Pub. No.: WO2018/233917
PCT Pub. Date: Dec. 27, 2018

(65) Prior Publication Data
US 2021/0364099 A1    Nov. 25, 2021

(30) Foreign Application Priority Data

Jun. 23, 2017   (DE) .......................... 102017210607.7

(51) Int. Cl.
*F16K 31/06*    (2006.01)
*F16K 37/00*    (2006.01)
*H01F 7/18*     (2006.01)

(52) U.S. Cl.
CPC ....... *H01F 7/1844* (2013.01); *F16K 31/0675* (2013.01); *F16K 37/0041* (2013.01); *H01F 2007/1888* (2013.01)

(58) Field of Classification Search
CPC ........... H01F 7/1844; H01F 2007/1888; F16K 31/0675; F16K 37/0041
(Continued)

(56) References Cited

U.S. PATENT DOCUMENTS

| | | | |
|---|---|---|---|
| 6,397,798 B1 | 6/2002 | Fiaccabrino | |
| 6,889,121 B1 | 5/2005 | Shahroudi et al. | |

(Continued)

FOREIGN PATENT DOCUMENTS

| | | |
|---|---|---|
| CN | 1548597 A | 11/2004 |
| CN | 101405667 A | 4/2009 |

(Continued)

OTHER PUBLICATIONS

International Search Report for PCT/EP2018/061224, dated Sep. 27, 2018.

*Primary Examiner* — Thienvu V Tran
*Assistant Examiner* — Sreeya Sreevatsa
(74) *Attorney, Agent, or Firm* — NORTON ROSE FULBRIGHT US LLP

(57) ABSTRACT

A method for controlling a part movable with a coil. In this case, a current flowing through the coil and/or a voltage applied to the coil is/are scanned in order to generate a coil signal. In a further step, at least one movement parameter representing an oscillatory movement of the part is ascertained by using the coil signal. Finally, at least one signal parameter of a dither signal is optionally changed to generate the oscillatory movement by comparing the movement parameter to the at least one setpoint value to adapt the oscillatory movement to the setpoint value.

15 Claims, 2 Drawing Sheets

(58) Field of Classification Search
USPC .......................................................... 361/160
See application file for complete search history.

(56) References Cited

U.S. PATENT DOCUMENTS

| | | | | |
|---|---|---|---|---|
| 2004/0225429 | A1* | 11/2004 | Keim | ................... F16H 61/0251 |
| | | | | 701/51 |
| 2008/0238391 | A1* | 10/2008 | Williams | .............. H01F 7/1844 |
| | | | | 323/283 |
| 2017/0062110 | A1* | 3/2017 | Matsumoto | ............. H01F 7/064 |
| 2018/0026532 | A1* | 1/2018 | Mizuno | ................. H02M 3/156 |
| | | | | 323/282 |
| 2018/0350497 | A1* | 12/2018 | Bange | ................... H01F 7/1844 |

FOREIGN PATENT DOCUMENTS

| | | | |
|---|---|---|---|
| DE | 102009020359 A1 | | 11/2010 |
| DE | 102013203776 A1 | | 6/2014 |
| DE | 102013212207 A1 | | 6/2014 |
| DE | 102015222991 A1 | | 5/2017 |
| JP | H0914486 A | | 1/1997 |
| JP | H09297602 A | | 11/1997 |
| JP | 2004293364 A | | 10/2004 |
| JP | 2015216421 A | | 12/2015 |
| JP | 2016162852 A | * | 9/2016 |
| JP | 2016162852 A | | 9/2016 |
| WO | 0225132 A1 | | 3/2002 |

* cited by examiner

METHOD AND DEVICE FOR CONTROLLING A PART MOVABLE WITH THE AID OF A COIL AND SOLENOID VALVE

FIELD OF THE INVENTION

The present invention is directed to a device or a method. The present invention is also to a computer program.

BACKGROUND INFORMATION

Electromagnetically actuated valves without position sensors are known whose slide or armature may carry out a small periodic oscillatory movement, also referred to as a dither, during operation to reduce interfering effects due to static friction or hysteresis. If the oscillatory movement is too extensive, it may result in undesirably great leakage or high energy consumption. If, however, the oscillatory movement is too small or if the armature even comes to a standstill, the hysteresis properties and the dynamics of the valve may considerably deteriorate. Typical examples of such valves are hydraulic pressure control valves or simple hydraulic proportional valves without position measurement.

SUMMARY OF THE INVENTION

Against this background, a method for controlling a part movable with the aid of a coil, furthermore a device which uses this method, a solenoid valve as well as ultimately a corresponding computer program according to the main descriptions herein are provided with the approach presented here. The measures recited in the further descriptions herein make advantageous refinements of and improvements on the device described herein possible.

A method for controlling a part movable with the aid of a coil, for example a solenoid valve, is provided, the method including the following steps:

scanning and filtering a current flowing through the coil and/or a voltage applied to the coil in order to generate a coil signal; and ascertaining at least one movement parameter representing an oscillatory movement of the part by using the coil signal.

In one optional step of changing, at least one signal parameter of a dither signal may be changed to generate the oscillatory movement by comparing the movement parameter to the at least one setpoint value in order to adapt the oscillatory movement to the setpoint value.

A coil may be understood to mean an inductance-forming electrical component for generating a magnetic field. A part, for example a valve part, may be understood to mean a part for directly or indirectly opening or closing a solenoid valve, for example. The part may be configured in the shape of a rod or stamp, for example, and be situated displaceably within or at the coil. In addition, the part may be coupled to a restoring spring, for example. In the case of an application of a solenoid valve, the solenoid valve may for example be a directly controlled, pilot-controlled, positively controlled, or pressure-controlled hydraulic or pneumatic valve. The solenoid valve may also be configured as a structural combination of a drive magnet together with a hydraulic part.

The scanning and filtering may be carried out with the aid of two methods. In the case of the first method, the coil signal (current and voltage measurement or current measurement and computed voltage signal) is smoothed with the aid of a low-pass filter, the limiting frequency being greater than the dither frequency, typically 1.5 times greater than the greatest occurring dither frequency, and subsequently scanned. A PWM synchronous scanning having 20 to 40 points per dither period is favorable, a value of 30 points per dither period is advantageous. As a preparation for the ascertainment, this signal is subsequently digitally filtered to generate the derivation of the signal. A filter cutoff frequency that corresponds to the dither frequency is favorable in this case.

In the case of the second method, the coil signal is scanned directly and PWM synchronously having at least 7 scanning points per PWM period. This is followed by a filtering through a gliding average value formation exactly over the length of a PWM period. As a preparation for the ascertainment, this signal is subsequently digitally filtered to generate the derivation of the signal. A filter cutoff frequency that corresponds to the dither frequency is again favorable in this case.

A movement parameter may be, for example, understood to mean a speed or position of the part during the oscillatory movement. A signal parameter of the dither signal may be understood to mean an amplitude, a frequency, or a signal form of the dither signal. The dither signal may, for example, develop through pulse width modulation and have any arbitrary periodic signal form. A setpoint value may be, for example, understood to mean a predefined speed with regard to the oscillatory movement or a maximum amplitude of the dither signal.

For the purpose of driving the solenoid valve, for example, a rectangular, pulse-width modulated voltage signal having 3.125 kHz, which is used to generate the time-dependent current basic signal, is typically applied to the coil. PWM frequencies between 500 Hz and 5 kHz are also conceivable. By adjusting the pulse width of the voltage signal, a periodic dither signal having frequencies in the range of 30 Hz to 250 Hz is modulated on the basic signal. It is also conceivable to directly use a low-frequency PWM in the frequency range of 30 Hz to 250 Hz as the dither signal.

The approach provided here is based on the finding that a coil current and/or a coil voltage may be scanned and converted into a corresponding movement parameter, such as a speed or position, for example, for the purpose of determining and controlling a movement state of an armature in a solenoid valve, for example a hydraulic valve, without the use of sensors. The physical model equations include the voltage at the coil and the current flowing through the coil. According to one specific embodiment, both of the above are to be known to determine the movement state. The voltage at the coil may be scanned or computed from the battery voltage and the duty cycle of the pulse width modulation. Using a method of this type, it is possible to detect an oscillatory movement of the armature and appropriately adapt it to a predefined setpoint without the aid of additional sensors. Effects of an instantaneous hydraulic load or aging effects, such as increased friction when adjusting the oscillatory movement, may thus be advantageously taken into account. The method proves particularly advantageous when deposits in the sealing gaps of the part inhibit the dither movement. The steps of scanning, ascertaining, and changing may be used to continuously adapt the dither parameters in such a way that the desirable dither movement appears regardless of the degree of contamination of the valve.

In the step of scanning, for example, the current and/or the voltage may be scanned at a scanning rate that is a function of the PWM frequency and/or of the PWM period of the signal. In this case, the current and/or the voltage may be scanned at least seven times per PWM period. For example, the current may be scanned and the voltage may be computed from a battery voltage and the duty cycle of a pulse width modulation signal. The coil signal may be filtered using a low-pass filter, whose limiting frequency is greater than the greatest occurring dither frequency. The coil signal or a prefiltered coil signal may be digitally low-pass filtered, a limiting frequency of the filtering being on the order of magnitude of the dither signal, in order to generate a time derivation of the coil signal or of the prefiltered coil signal.

According to one specific embodiment, the applied voltage is computed PWM synchronously from the duty factor and the diode voltage instead of measuring battery voltage U batt.

According to another specific embodiment, the signal parameter may be changed in the step of changing in that the duty cycle of the PWM signal is adapted. This makes it possible to generate the dither signal particularly efficiently.

It is furthermore advantageous when in the step of ascertaining, the movement parameter is ascertained by using at least one model function imitating the oscillatory movement. A model function may be understood to mean a functional equation that is based on an empirically ascertained physical model, for example, for the purpose of illustrating the movement parameter as a function of time. In this way, the movement parameter may be ascertained at a high accuracy and reliability with relatively little calculating effort.

Furthermore, the coil signal may be averaged in a step of averaging in order to generate an averaged coil signal. In the step of ascertaining, the movement parameter is accordingly ascertained by using the averaged coil signal. The averaged coil signal may represent a current and/or a voltage average value, for example. The error susceptibility of the method can be thereby reduced.

According to another specific embodiment, a speed or, additionally or alternatively, a position of the part may be ascertained as the movement parameter in the step of ascertaining. In this way, the movement parameter may be ascertained with little computing effort and a sufficient degree of accuracy.

In the step of changing, an amplitude or, additionally or alternatively, a frequency of the dither signal may be changed as the signal parameter. In this way, the dither signal may be adapted to the setpoint value precisely, efficiently, and flexibly.

This method may, for example, be implemented in a software or hardware or in a mix of software and hardware, such as in a control unit.

The approach presented here furthermore provides a device which is configured to carry out, control, or implement in appropriate devices the steps of one variant of the method presented here. This embodiment variant of the present invention in the form of a device also makes it possible to achieve the object underlying the present invention rapidly and efficiently.

For this purpose, the device may include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit may be, for example, a signal processor, a microcontroller, or the like, the memory unit potentially being a flash memory, an EEPROM, or a magnetic memory unit. The communication interface may be configured to read in or output data in a wireless and/or wired manner; a communication interface, which is able to read in or output data in a wired manner, may read in these data electrically or optically, for example, from a corresponding data transmission line or output these data to a corresponding data transmission line.

In the present case, a device may be understood to mean an electrical device which processes sensor signals and outputs control and/or data signals as a function thereof. The device may have an interface which may be configured as hard- and/or software. In the case of a hardware configuration, the interfaces may, for example, be a part of a so-called system ASIC, which includes various functions of the device. It is, however, also possible that the interfaces are independent, integrated circuits or are at least partially made of discrete components. In the case of a software configuration, the interfaces may be software modules which are present on a microcontroller in addition to other software modules, for example.

In addition, the approach presented here provides a solenoid valve having the following features:

at least one coil;

at least one part movable with the aid of the coil; and a device according to a preceding specific embodiment.

A computer program product or a computer program having program code is also advantageous, which may be stored on a machine-readable carrier or a memory medium, such as a semiconductor memory, a hard disk memory, or an optical memory, and is used to carry out, implement and/or control the steps of the method according to one of the specific embodiments described above, in particular when the program product is run on a computer or a device.

Exemplary embodiments of the present invention are illustrated in the drawings and explained in greater detail in the description below.

In the following description of advantageous exemplary embodiments of the present invention, the elements which are illustrated in the various figures and appear to be similar are identified with identical or similar reference numerals; a repetitive description of these elements is dispensed with.

DETAILED DESCRIPTION

The approach described here is based on a solenoid valve by way of example with reference to the following figures.

Figure 1:
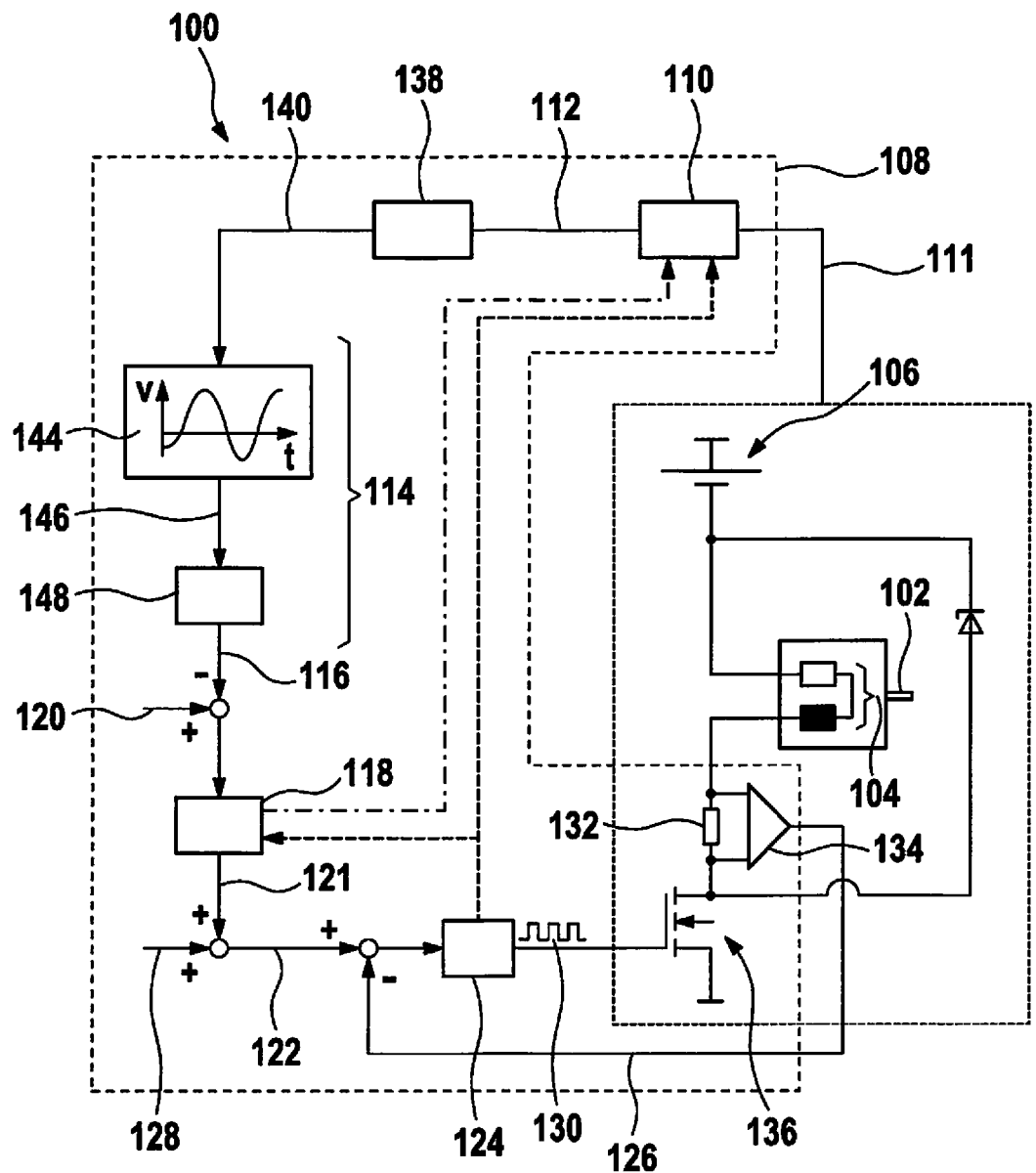
FIG. 1 shows a schematic illustration of a solenoid valve according to one exemplary embodiment.

FIG. 1 shows a schematic illustration of a solenoid valve 100 according to one exemplary embodiment. Solenoid valve 100 includes a part 102 for opening and closing solenoid valve 100. Part 102, also referred to as an armature or a slide, is electromagnetically movable with the aid of a coil 104. Coil 104 is connected to a battery 106 for this purpose. Part 102 is configured to be put in an oscillatory movement, which may reduce the static friction of part 102, with the aid of coil 104. For controlling part 102, solenoid valve 100 includes a device 108 having a scanning device 110 configured to scan a coil raw signal 111, which represents, depending on the exemplary embodiment, a current I(t) flowing through coil 104 and/or also a voltage U(t) applied to coil 104, at a predefined scanning rate and to forward it as coil signal 112 to an ascertaining unit 114 of device 108 via an optional averaging unit 138. Ascertaining unit 114 is configured to ascertain at least one movement parameter 116, for example a speed or position of part 102 during the dither movement, by using coil signal 112. Ascertaining unit 114 is connected to a changing unit 118, for example in the form of a dither controller, which is configured to receive movement parameter 116 from ascertaining unit 114 and to compare same to at least one setpoint value 120, for example a speed setpoint value, and to change, depending on a deviation between movement parameter 116 and setpoint value 120 ascertained during the comparison, at least one signal parameter of a dither setpoint signal 121, for example its frequency or amplitude, which is required for generating the oscillatory movement of part 102, in such a way that the oscillatory movement is approximated to the setpoint value.

According to the exemplary embodiment shown in FIG. 1, dither setpoint signal 121, which is adapted by changing unit 118 by using movement parameter 116, is provided via an addition point to a current controller 124 of solenoid valve 100 that is configured to adapt measurement 126 of the actual current flowing through coil 104 to a setpoint current 122. Setpoint current 122 is composed of dither setpoint signal 121 and setpoint current average value 128. As a result of this adaptation, current controller 124 generates a pulse width modulation signal 130 that is based on dither setpoint signal 121, among other things, and which is used to generate the oscillatory movement of part 102. According to FIG. 1, measurement 126 of the actual current takes place by way of example by using a shunt 132 including a connected amplifier 134. Current controller 124 is connected to shunt 132 by way of example via a field effect transistor 136.

In one exemplary embodiment, all processes 110 to 118 take place in device 108 as a function of a period of pulse width modulation signal 130, also referred to as a PWM period, provided by current controller 124, in particular also the ascertainment of movement parameter 116. The fact that the scanning of coil raw signal 111 and the computation of the change in changing unit 118 is a function of the PWM period is indicated by a dashed connecting line.

In another exemplary embodiment, all processes 110 to 118 take place as a function of a period of dither signal 121 generated by changing unit 118. In this exemplary embodiment, scanning unit 110 is combined with a low-pass filter connected upstream. Here, low-pass filtered coil raw signal 111 is scanned at 30 points per dither period, for example. The fact that the scanning of coil raw signal 111 is a function of the dither period is indicated by a dotted connecting line between changing unit 118 and scanning unit 110.

According to the exemplary embodiment shown in FIG. 1, device 108 includes an optional averaging unit 138 that is configured to receive coil signal 112 from scanning unit 110 and to carry out an averaging, for example of current I(t) or of voltage U(t), based on coil signal 112. As a result of the averaging, averaging unit 138 outputs an averaged coil signal 140 to ascertaining unit 114, ascertaining unit 114 being configured to ascertain movement parameter 116 based on averaged coil signal 140.

As is apparent from FIG. 1, the ascertainment of movement parameter 116 initially takes place on the basis of a suitable physical model by using an appropriate model function in a corresponding computing unit 144 of ascertaining unit 114. The sinus-shaped curve illustrated in the context of computing unit 144 is an example of a typical speed curve. Speed curve 146 that results from this computation and represents the oscillatory movement is further used in another computing unit 148 of ascertaining unit 114, which ultimately computes movement parameter 116 as an actual top speed, which is to be compared to the setpoint value per dither period by using signal 146.

Figure 2:
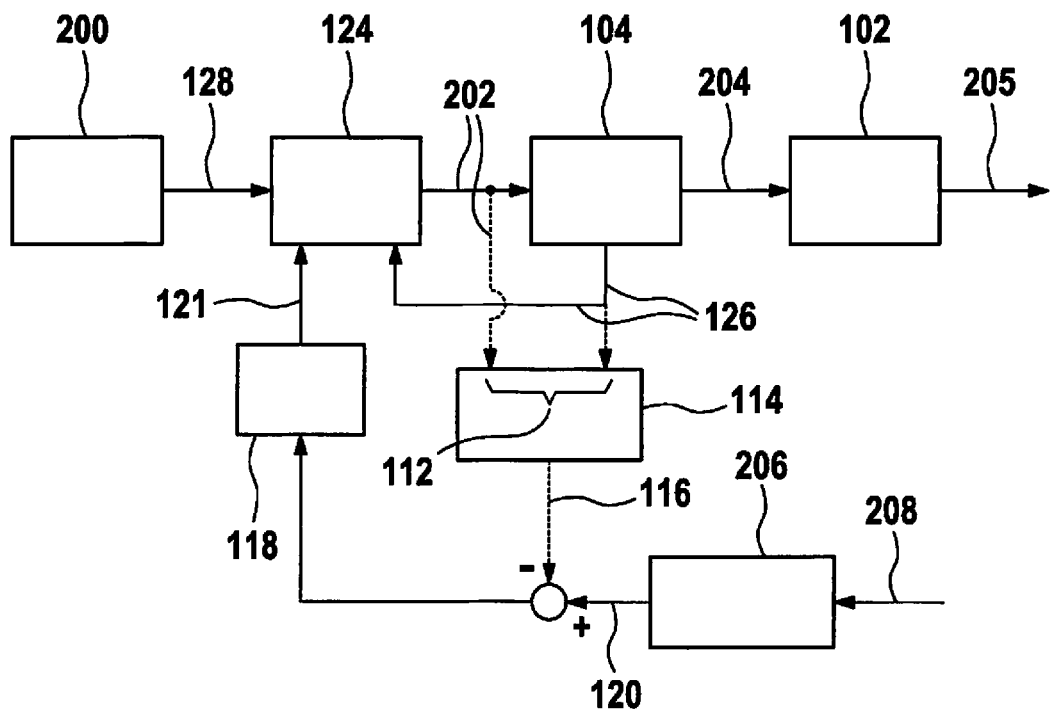
FIG. 2 shows a block diagram to illustrate a sequence in the case of a part of a solenoid valve being controlled according to one exemplary embodiment.

FIG. 2 shows a block diagram to illustrate a sequence in the case of a part 102 of a solenoid valve being controlled according to one exemplary embodiment, for example the solenoid valve shown previously with reference to FIG. 1. The figure shows an exemplary configuration of the solenoid valve including a control 200, which predefines current setpoint values 128 for current controller 124. By generating a typically pulse-width modulated voltage 202, current controller 124 ensures that a certain current 126 flows through coil 104. Current 126 generates a force 204 and thus a movement 205 of part 102, for example an armature/slide combination, characterized by a certain speed and a certain position.

Ascertaining unit 114, also referred to as a detection part, receives information about the actual movement state of part 102 from the measured variables of voltage 202 and current 126, each of which constitutes coil signal 112.

Ascertaining unit 114 is connected in the signal flow direction to an addition point in which parameter 116 describing the movement state of the part is compared to a predefined dither value determined in block 206.

This block 206 termed dither unit ascertains the desirable properties, such as frequency, amplitude, or signal form of periodic predefined dither signal 120, for example, which ensures the desirable oscillatory movement of part 102, by taking into account a working point, such as temperature and current average value, for example.

In changing unit 118, also referred to as an adaption part, signal 121 is generated that controls the generation of the dither portion in current signal 126 in current controller 124. This takes place in that changing unit 118 makes the parameters of signal 121, for example the amplitude, suitably larger or smaller. Signal 121 is ultimately used to change the movement state of part 102 into the desirable direction.

As mentioned above, the detection of the movement of part 102 takes place, for example, by using a model equation that takes into account the feedback effect of the armature movement on the current through coil 104. This model equation, also referred to above as a model function, has the form $$f(I, \dot{I}, \ddot{I}, \ldots, U, \dot{U}, \ddot{U}, \ldots s, v) = 0$$

and describes the correlation between coil current I and its time derivations incorporating voltage U at coil 104 and its time derivations as well as armature position s and armature speed v. The function is in general not linear and is a function of the nature of the magnetic circuit. The armature movement state may be computed particularly easily, when the function is only to a minor extent a function of v or to a minor extent a function of s in the working range of the solenoid valve. In this case, the dependence may be ignored and the above model equation is solved according to s or v, so that the position or the speed may be computed at any point in time from the known variables of current or voltage and their derivations.

The intensity of the present oscillatory movement is determined from the thus computed progression of the position or speed over time. If the intensity of the oscillatory movement is excessively high or low, superimposed periodic dither setpoint signal 121 is correspondingly adapted to adjust the intensity of the oscillatory movement to a desirable value.

If the model equation is only to a negligibly small extent neither a function of s nor of v, the fact is made use of that in the case of a determined current average value and a known current average value history, a similar intensity and thus a similar stroke are always present in the solenoid valve, thus allowing for the resolution of the model equation according to v. The accuracy thus achievable when computing v is sufficient in most cases to adjust a desirable oscillatory movement of part 102.

Changing unit 118 uses a feature of the oscillatory movement, for example a maximum amplitude of the oscillatory movement, to adapt at least one signal parameter of dither setpoint signal 121, for example its amplitude or frequency, in the sense of a control. Various variants from the field of control engineering are possible:

two-step control, three-step control or similar, simple concepts, for example including a dead zone and P-feedback (the oscillatory movement is acceptable in a certain range and an adaptation is not necessary);

PID controller that uses the difference between a setpoint characteristic and an actual characteristic of the oscillatory movement as the control deviation; and adaptation of parameters or characteristic curves in a (pilot) control that adjusts the dither signal parameters as a function of other environmental parameters.

A slow implementation of the adaptation part compared to the dynamics of current controller 124 is advantageous to avoid an undesirable interaction with current controller 124. This takes place, for example, by filtering computed movement parameter 116.

The scanning of voltage 202 or current 126 takes place, for example, with the aid of a processor having a very high scanning rate. Only this high scanning rate makes it possible to provide a physical model for efficiently computing the speed of the armature with the correspondingly scanned values, so that an armature speed may be computed as the predefining dither control and may be successfully used for dither control.

Figure 3:
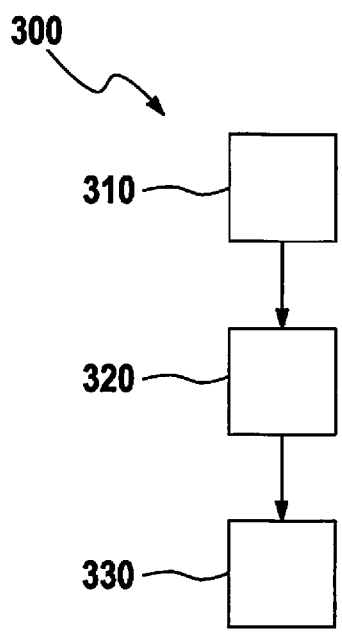
FIG. 3 shows a flow chart of a method according to one exemplary embodiment.

FIG. 3 shows a flow chart of a method 300 according to one exemplary embodiment. Method 300 for controlling a part of a solenoid valve movable with the aid of a coil may be carried out using a device, for example, such as the one described previously based on FIGS. 1 and 2. In this case, the coil signal is generated by scanning a coil current or a voltage applied to the coil at a sufficiently high scanning rate in a step 310. In a further step 320, at least one movement parameter representing the oscillatory movement of the part, for example a speed or a position of the part during the oscillatory movement, is ascertained by using the coil signal. The ascertainment of the movement parameter takes place in particular on the basis of a physical model in the form of a corresponding functional equation with regard to the movement of the part. In a further step 330, the adaptation of the dither signal, which is generated for example by pulse width modulation, for generating the oscillatory movement is carried out. Here, the movement parameter is compared to at least one predefined setpoint value, for example a predefined speed, and the oscillatory movement is approximated to the setpoint value by appropriately controlling at least one signal parameter of the dither signal.

If an exemplary embodiment includes an "and/or" linkage between a first feature and a second feature, this should be read in such a way that the exemplary embodiment according to one specific embodiment has both the first feature and the second feature and according to another specific embodiment it has either only the first feature or only the second feature.

What is claimed is:

1. A method for controlling a part movable with a coil, the method comprising:
   scanning a current flowing through the coil and/or a voltage applied to the coil to generate a coil signal; and
   ascertaining at least one movement parameter representing an oscillatory movement of the part by using the coil signal,
   wherein in the ascertaining, a speed and/or a position of the part is ascertained during the oscillatory movement as the at least one movement parameter,
   changing at least one signal parameter of a dither setpoint signal for generating the oscillatory movement by comparing the at least one movement parameter to a setpoint value to adapt the oscillatory movement to the dither setpoint value,
   wherein the dither setpoint signal is provided to a current controller that is configured to adapt the current flowing through the coil to a setpoint current, wherein the setpoint current includes the dither setpoint signal and a setpoint current average value.

2. The method of claim 1, wherein in the scanning, the current and/or the voltage is/are scanned at a scanning rate that is a function of the dither frequency and/or dither period of the dither setpoint signal.

3. The method of claim 2, wherein in the scanning, the current and/or the voltage is/are scanned 20 to 40 times per dither period.

4. The method of claim 1, wherein in the scanning, the current and/or the voltage is/are scanned at a scanning rate that is a function of the PWM frequency and/or PWM period of the dither setpoint signal.

5. The method of claim 4, wherein in the scanning, the current and/or the voltage is/are scanned at least seven times per PWM period.

6. The method of claim 1, wherein the current is scanned and the voltage is computed from a battery voltage and a duty cycle of a pulse width modulation signal.

7. The method of claim 1, wherein a coil raw signal is filtered using a low-pass filter, whose limiting frequency is greater than the greatest occurring dither frequency.

8. The method of claim 1, wherein the coil signal or a prefiltered coil signal is digitally low-pass filtered, a limiting frequency of the filtering being in the order of magnitude of the dither signal, to generate a time derivation of the coil signal or of the prefiltered coil signal.

9. The method of claim 1, wherein in the ascertaining, the at least one movement parameter is ascertained by using at least one model function imitating the oscillatory movement.

10. The method of claim 1, further comprising:
    averaging the coil signal to generate an averaged coil signal, the at least one movement parameter being ascertained in the ascertaining by using the averaged coil signal.

11. The method of claim 1, wherein in the ascertaining, an amplitude or a root-mean-square value of the speed and/or position of the part is ascertained as the at least one movement parameter.

12. The method of claim 1, wherein in the changing, an amplitude or a root-mean-square value and/or a frequency of the dither setpoint signal is changed as the at least one signal parameter.

13. A device for controlling a part movable with a coil, comprising:
- at least one unit configured to perform the following:
  - scanning a current flowing through the coil and/or a voltage applied to the coil to generate a coil signal; and
  - ascertaining at least one movement parameter representing an oscillatory movement of the part by using the coil signal,
  - wherein in the ascertaining, a speed and/or a position of the part is ascertained during the oscillatory movement as the at least one movement parameter,
  - changing at least one signal parameter of a dither setpoint signal for generating the oscillatory movement by comparing the at least one movement parameter to a setpoint value to adapt the oscillatory movement to the dither setpoint value,
  - wherein the dither setpoint signal is provided to a current controller that is configured to adapt the current flowing through the coil to a setpoint current, wherein the setpoint current includes the dither setpoint signal and a setpoint current average value.

14. A solenoid valve, comprising:
- at least one coil;
- at least one part movable with the coil; and
- a device for controlling the at least one part movable with the coil, including at least one unit configured to perform the following:
  - scanning a current flowing through the coil and/or a voltage applied to the coil to generate a coil signal; and
  - ascertaining at least one movement parameter representing an oscillatory movement of the part by using the coil signal,
  - wherein in the ascertaining, a speed and/or a position of the part is ascertained during the oscillatory movement as the at least one movement parameter,
  - changing at least one signal parameter of a dither setpoint signal for generating the oscillatory movement by comparing the at least one movement parameter to a setpoint value to adapt the oscillatory movement to the dither setpoint value,
  - wherein the dither setpoint signal is provided to a current controller that is configured to adapt the current flowing through the coil to a setpoint current, wherein the setpoint current includes the dither setpoint signal and a setpoint current average value.

15. A non-transitory computer readable medium having a computer program, which is executable by a processor, comprising:
- a program code arrangement having program code for controlling a part movable with a coil, by performing the following:
  - scanning a current flowing through the coil and/or a voltage applied to the coil to generate a coil signal; and
  - ascertaining at least one movement parameter representing an oscillatory movement of the part by using the coil signal,
  - wherein in the ascertaining, a speed and/or a position of the part is ascertained during the oscillatory movement as the at least one movement parameter,
  - changing at least one signal parameter of a dither setpoint signal for generating the oscillatory movement by comparing the at least one movement parameter to a setpoint value to adapt the oscillatory movement to the dither setpoint value,
  - wherein the dither setpoint signal is provided to a current controller that is configured to adapt the current flowing through the coil to a setpoint current, wherein the setpoint current includes the dither setpoint signal and a setpoint current average value.

* * * * *